United States Patent [19]

Serby

[11] Patent Number: 4,924,499

[45] Date of Patent: May 8, 1990

[54] TIMER CONTROL FOR TELEPHONE

[76] Inventor: Victor M. Serby, 255 Hewlett Neck Rd., Woodmere, N.Y. 11598

[21] Appl. No.: 162,500

[22] Filed: Feb. 25, 1988

[51] Int. Cl.⁵ .................... H04M 1/21; H04M 1/66
[52] U.S. Cl. ................................. 379/200; 379/373
[58] Field of Search ............ 379/199, 200, 190, 131, 379/373, 442, 82

[56] References Cited

U.S. PATENT DOCUMENTS

| | | | |
|---|---|---|---|
| 4,297,534 | 10/1981 | Epstein et al. | 379/200 |
| 4,405,839 | 9/1983 | Groff | 379/188 |
| 4,480,154 | 10/1984 | Klee | 379/373 |
| 4,588,901 | 5/1986 | Maclay et al. | 307/141.1 |

Primary Examiner—Stewart J. Levy
Assistant Examiner—Michele Simons
Attorney, Agent, or Firm—Victor M. Serby

[57] ABSTRACT

A time control for disabling a telephone at preprogrammed times and its associated features is disclosed. The preferred embodiment of the invention includes a programmable timer which controls a switch to turn the telphone ringer on and off, a programmable countdown timer which also controls the on/off state of the telephone ringer, a means for automatically and independently providing outgoing telephone service when incoming service is disabled by timer control and automatically restoring timer control when the outgoing call is terminated, and a manual override to suspend device control of the telephone. The combination of specific features of the invention will depend on the specific application or intended use.

4 Claims, 2 Drawing Sheets

TIMER CONTROL FOR TELEPHONE

BACKGROUND OF INVENTION

Ever since Thomas A. Watson (Alexander Graham Bell's assistant) patented the "polarized ringer" in 1878 and telephones obtained widespread use, unwanted telephone calls when one is sleeping have been a problem. Discourteous people call late at night and often wrong numbers disturb the sleeper at odd hours of the night.

People solved this problem by taking the phone off the hook, unplugging the phone from the wall, and lately disconnecting the modular jack at the back of the phone before they went to sleep. The problem with all these methods is that the phone has to be manually reconnected to place or receive calls. Often the phone would not be hung up, plugged in or otherwise reconnected and telephone calls during times when they are welcome are missed. In addition, people often forget to again disconnect their phones at night and are often rudely awakened by a midnight caller.

Business offices have their own problems with telephones. Unauthorized after hour use is of particular importance because it costs businesses thousands of dollars per year. Many attempts have been made to thwart unauthorized after hour business phone use. Among them are dial locks, and computerized line access codes. The problem with dial locks is they have to be installed each night and removed each morning. Also they can be easily defeated because they only protect the telephone itself and not the line. In addition they do not work with pushbutton phones. Computer access codes on the other hand require very expensive phone equipment which is beyond the means of most small firms.

What is needed is a device that will automatically turn all or some telephone functions on and off as a function of time. Many devices currently exist which will turn electric applicances operating on AC line current on and off at preprogrammed times. For example, patent number 4,588,901 describes a timer control for television to limit total viewing time to a preprogrammed limit by open circuiting the AC line when the programmed time expires. Many other ingenious timer controlled switches and circuits have been disclosed in previous patents and many others are currently for sale commercially. However, no device has been invented which solves the particular problems associated with telephone circuit timer control.

SUMMARY OF INVENTION

My invention solves the aforementioned problems by using circuitry controlled by programmable timers to turn the telephone ringer circuit and/or the telephone dialing and speech circuits on and off at proprogrammed times or for a preprogrammed interval. Additional features which are part of the invention are also included. One version of the invention inserts between the modular jack on the back of the telephone and the modular plug on the wire coming from the wall or telephone answering machine for a particular telephone. When used in conjunction with a phone answering machine, the telephone will not ring during programmed off times and the answering machine will answer the midnight call without waking the sleeper. The invention can even be incorporated as a feature in telephone answering machines, alarm clocks or other appliances. A complete telephone can even be constructed which contains the invention internally so individual phone circuits and hence phone functions can be activated and deactivated as a function of time. The invention can also be inserted immediately after the interface for the incoming phone service to control all the phones on the same line in a whole house or office.

The basic invention comprises a programmable timer controlling a switch to open and close at programmed intervals. When used external to a telephone, this switch interrupts either the tip (15) or ring (16) wires in the telephone circuit. Added circuitry which is part of the invention, enables control over the ring and dialing functions of the phone. When used internal to a telephone, the on/off state of individual circuits such as but not limited to the ringer circuit or dialing circuit can be controlled as a function of time. The timer and the switch may be mechanical, electromechanical, solid state or any combination thereof. The invention can be powered by the AC line, batteries, the phone line or any other power source. The user of the invention simply sets the correct time and then programs the time interval he or she does not want to have the phone ring and/or the time interval he or she does not want the phone to be used for initiating calls. The timer can be a 24 hour type with just one program interavl or it can be a one week timer with several program intervals or any other timer type desired. The basic timer controlled telephone line where the invention is placed at the incoming phone service interface behind a locked door will be sufficient for the business that wants all the phones turned on and off at specific times but residential customers will need additional features.

An additional feature of the invention is the ability to make outgoing phone calls in a normal fashion even when the timer disables the ringer function with automatic resetting to the programmed state after the call is finished. This can be accomplished by sensing the flow of DC current to the phone through a sense resistor when the receiver is lifted off the hook to initiate the call. However it is best accomplished by placing a diode in series with the telephone, thereby enabling DC line current to flow normally so one can initiate a call and talk, but AC ringer current is rectified and hence can not ring the bell. By placing a switch in series with the diode, one can selectively activate this feature of the invention. If the rectifier is an SCR, timer control of the dialing function is achieved by firing the SCR as a function of the output of the timer.

Another feature of the invention is a quickly programmable timer which when activated will prevent the telephone from ringing for a predetermined time. This is useful for occasions when one does not want to be disturbed by telephone calls for a specified period of time. For example an afternoon nap or business meeting are two such occasions. A quick timer erase button is also provided if one wishes to restore incoming phone service before time expires.

Still another feature of this invention is a manual override which defects timer control of the invention. The override can be made to stay on until manually reset or it can be made to be automatically reset by the next programmed clock cycle. The override is carried out by placing another switch in parallel across all timer controlled switches in the invention. Control of this switch is either manual or by a timer.

DESCRIPTION OF PREFERRED EMBODIMENT

The preferred embodiment of the invention includes all the aforementioned features in addition to the basic invention of a timer for controlling telephone circuits. Preferable construction includes small physical size, solid state timers and switches and low power consumption. Standard modular phone jacks and plugs are preferred for ease of connection to most telephones.

Figure 4:
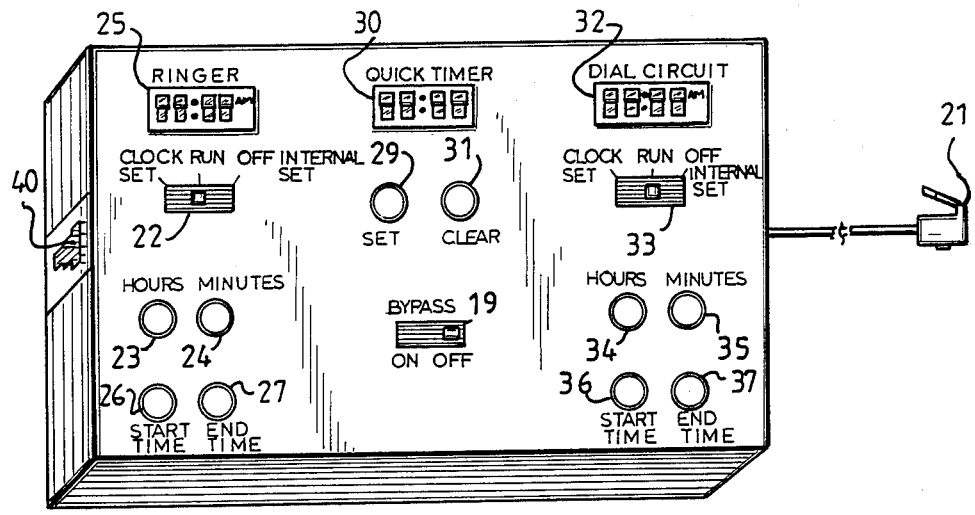
FIG. 4 is an outline drawing of the invention with all its features.

In FIG. 4, a modular phone plug from either the wall or a telephone answering machine plugs into the modular input jack (20) of the invention. The modular plug (21) of the invention plugs into the modular jack of a telephone. The user of the invention then positions switch (22) to "clock set" and then depresses button (23) and button (24) to set the hours and minutes respectively to the correct time of day, LCD display (25) will display the time setting. The user then positions switch (22) to "off interval set" to program the interval he does not wish to receive phone calls. He presses the "start time" button (26) and then sets the start time by using the "hours button" (23) and minutes button (24). He similarly sets the end time of the off interval by depressing "end time button (27) and setting the hours and minutes as before. The user then positions switch (22) to the "run" position and "bypass" switch (19) to the off position. The telephone will now not ring during the programmed off interval. The user similarly sets the clock and the off interval time he does not wish outgoing calls to be made by using switch 33, and buttons 34, 35, 36 and 37 in conjunction with LCD display 32. The quick timer function is enabled by pressing the quick timer set button (29). Each time this button is pressed, 15 minutes are added to the quick timer clock, LCD (30) displays the time remaining on the quick timer during which period the telephone will not ring. Clear button (31) when pressed resets the time on the quick timer clock to zero so there is no control over phone operation by the quick timer.

Figure 1:
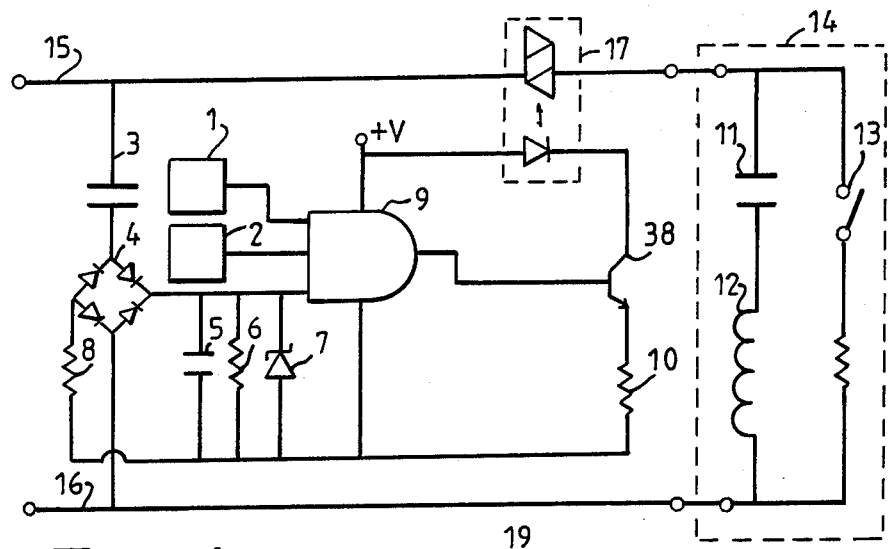
FIG. 1 is a schematic representation of a circuit which will prevent the telephone from ringing during programmed off intervals, allow the telephone to ring and be answered during programmed on intervals, yet prevent outgoing telephone calls from being placed.

Referring to FIG. 1, the output state of ring interval timer (1) which is a logical low during programmed off times and high otherwise is gated with the output of quick timer (2) which is a logical high when time expires and low otherwise and with the output of a ring detector circuit which is high upon the presence of a ring signal on the phone line. The output of AND gate (9) controls the flow of current through the diode section of opto-coupled triac driver (17). Only when both timer outputs are a logical high and a ring signal is present on the line, will the triac section of (17) conduct and thus complete the telephone circuit, allowing the ring signal to ring the bell (12) in the telephone (14). The purpose of the ring signal detector which includes DC blocking capacitor (3), rectifier bridge (4) zener diode (7) and current limiting resistor (8) is to prevent outgoing calls from being made when timers (1,2) are outputting a logical high but no ring signal is present on the line. When a ring signal is present an outgoing call can not be made. Another purpose of the ring signal detector is to reduce power consumption by turning on transistor (11) only when a ring signal is present. This is important if battery operation or telephone line power is used. When the output of the gate (9) is a logical low, the triac driver (17) does not conduct, the tip wire (15) is open circuited and the phone can not ring. The RC time constant of resistor (6) and capacitor (5) is chosen so the input to the gate is held at a logical high long enough so the holding current can be established in the triac section of (17) when one closes hookswitch (13) by answering the phone (14). A time constant of about 1 second is sufficient. If one were to try to initiate a call using this set-up, he would not be able to since there would be no detected ring signal to enable the output of the gate and turn on the triac; the telephone line would seem "dead".

The quick timer function is best accomplished by having a separate countdown timer (2) programmable in 15 minute intervals by pushing a button similar to a "snooze" feature of an alarm clock. The output of the timer (2) is a logical low when it is set and a logical high when time expires. The output of the timers (1, 2) are gated by an AND gate (9) so either/or will have control over the off state of triac driver (17). Of course other logic combinations with different gating can be used to accomplish the same functions as well as breaking circuit continuity in ring wire (16) instead of tip wire (15).

Figure 2:
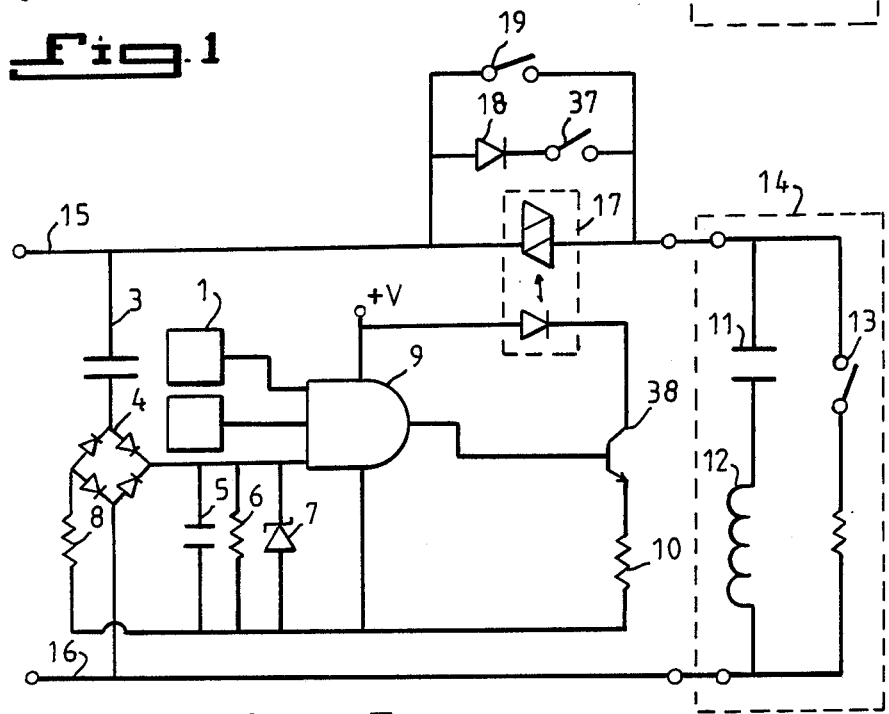
FIG. 2 is the circuit of FIG. 1 with an added diode which enables telephone calls to be placed at all times without affecting the circuity which prevents the telephone from ringing.
Figure 3:
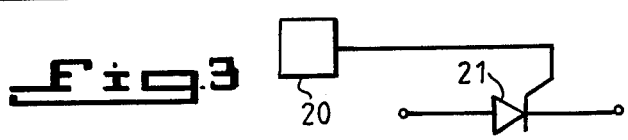
FIG. 3 is a SCR whose gate is controlled by a timer which when used in place of the added rectifier diode in FIG. 2 allows timer control of the dialing feature of the telephone.

FIG. 2 is the circuit of FIG. 1 with a means for allowing a telephone call to be placed independent of the state of triac driver (17). Diode (18) is placed in series with telephone (14) and in parallel with triac driver (17) so that the DC current needed to operate the dial and speech circuits can flow normally but the AC ring signal is rectified so telephone capacitor (11) remains charged and the ringer (12) can not ring when triac driver (17) is not conducting. An optional switch (37) can be added in series with the diode to selectively activate this feature of the invention. Switch (9) of FIGS. 2 and 4 is to bypass the invention to restore normal telephone service in the event one wishes to override operation of the invention. The timer (20) and SCR (21) of FIG. 3 can be inserted in place of diode (18) of FIG. 2 to achieve timer control of the dialing and speech functions. When the output of programmable timer (20) is a logical low, SCR (18) can not fire because there is no gate signal present and hence no flow of phone line current can occur. If one picks up the phone to initiate a call, he will hear nothing and will not be able to dial. When programmable timer (20) outputs a logical high by virtue of its programmed "on" interval, SCR (21) will fire when one closes hookswitch (13) by picking up the phone receiver. DC phone line current can now flow and a call can be initiated in the usual fashion. Once initiated, a call will not be terminated if timer (20) falls to a logical low because the holding current established in SCR (21) will be sufficient to maintain its on state.

Figure 5:
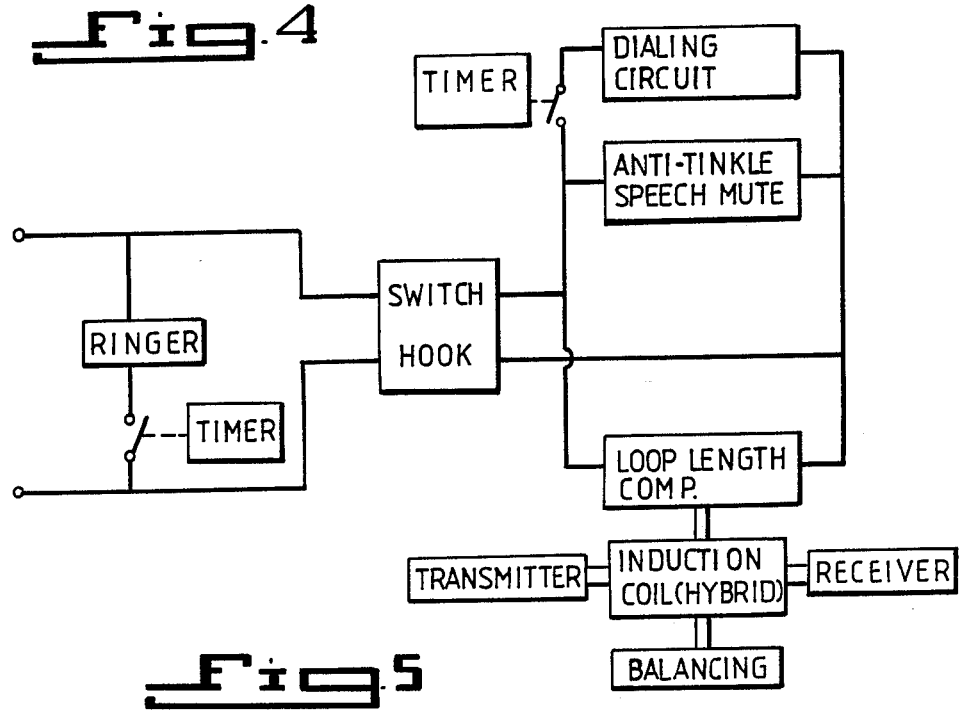
FIG. 5 is a block diagram of a telephone showing timer control of individual telephone circuits. It is to be understood that functions shown in blocks such as timers are prior art and are therefore not shown in detail.

FIG. 5 shows a block diagram of a telephone with the dialing and ringer circuits under timer control. By controlling a switch with a timer to effectively block current flow in individual telephone circuits, the same functions of timer control of the ringer and dialing circuit can be achieved internal to the telephone.

Although a specific embodiment of the present invention has been described in detail above, it is readily apparent that those skilled in the art and science may make various modifications and changes to the present invention without departing from the spirit and scope thereof. These changes include but are not limited to substitution of mechanical or electromechanical components or control means for electronic circuits, substitution of equivalent circuits or circuit logic, or incorporation of the invention as a feature of other equipment. It is to be expressly understood that this invention is limited by the following claims.

I claim:

1. A device for selectively and independently switching the dialing and ringing functions of a telephone between operating and non-operating states comprising:
    (a) a switch having a first state and a second state which can allow the flow of phone line current to said telephone when said switch is in said first state and can restrict the flow of phone line current to said telephone when said switch is in said second state;
    (b) a means for detecting a ring signal on a telephone line;
    (c) a timer acting in conjunction with said means for detecting a ring signal to control said states of said switch, said switch being in said second state in absence of a detected ring signal;
    (d) rectification means for allowing the flow of DC current to said telephone and rectifying AC current to said telephone, said rectification means bypassing said switch; and
    (e) means to selectively allow or block current flow through said rectification means.

2. A circuit for selectively and independently disabling the ringer and dialing functions of a telephone comprising:
    (a) a means for selectively blocking or allowing an AC ring signal to said telephone;
    (b) a separate means for selectively blocking or allowing DC line current to said telephone's dialing circuit;
    (c) a timer controlling said means for selectively blocking or allowing said AC ring signal to said telephone's ringer; and
    (d) a second timer controlling said means for selectively allowing or blocking DC line current to said telephone.

3. A circuit for selectively and independently disabling the ringer and dialing functions of a telephone as claimed in claim 2 wherein said circuit is incorporated as part of a telephone answering machine.

4. A telephone comprising:
    (a) a ringer circuit having a first operating state and a second non-operating state;
    (b) a first switch having a first conducting state and a second non-conducting state, in series with said ringer circuit;
    (c) a timer having a programmable enabling output and a disabling output, said enabling output controlling said first switch to said first state and said disabling output controlling said first switch to said second state;
    (d) a dialing circuit having an operating state and a non-operating state;
    (e) a second switch having a first conducting state and a second non-conducting state, in series with said dialing circuit; and
    (f) a second timer having a programmable enabling output and a disabling output, said enabling output of said second timer controlling said second switch to said first state and said disabling output of said second timer controlling said second switch to said second state.

* * * * *